June 3, 1941.   H. G. CUNNINGHAM   2,243,838
DRAFTING MACHINE
Filed Aug. 7, 1939   5 Sheets-Sheet 3

Inventor
HARRY G. CUNNINGHAM,
By
Attorney

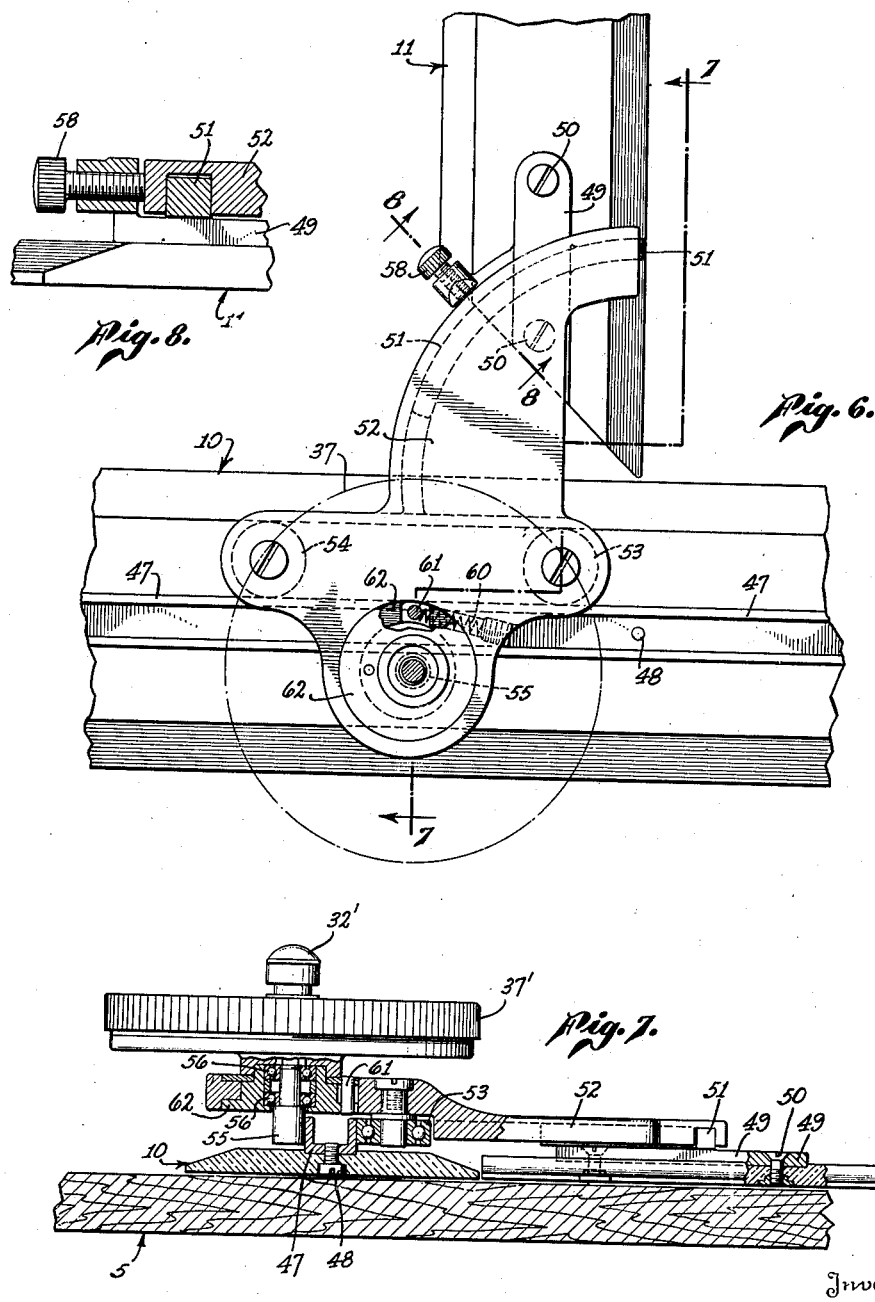

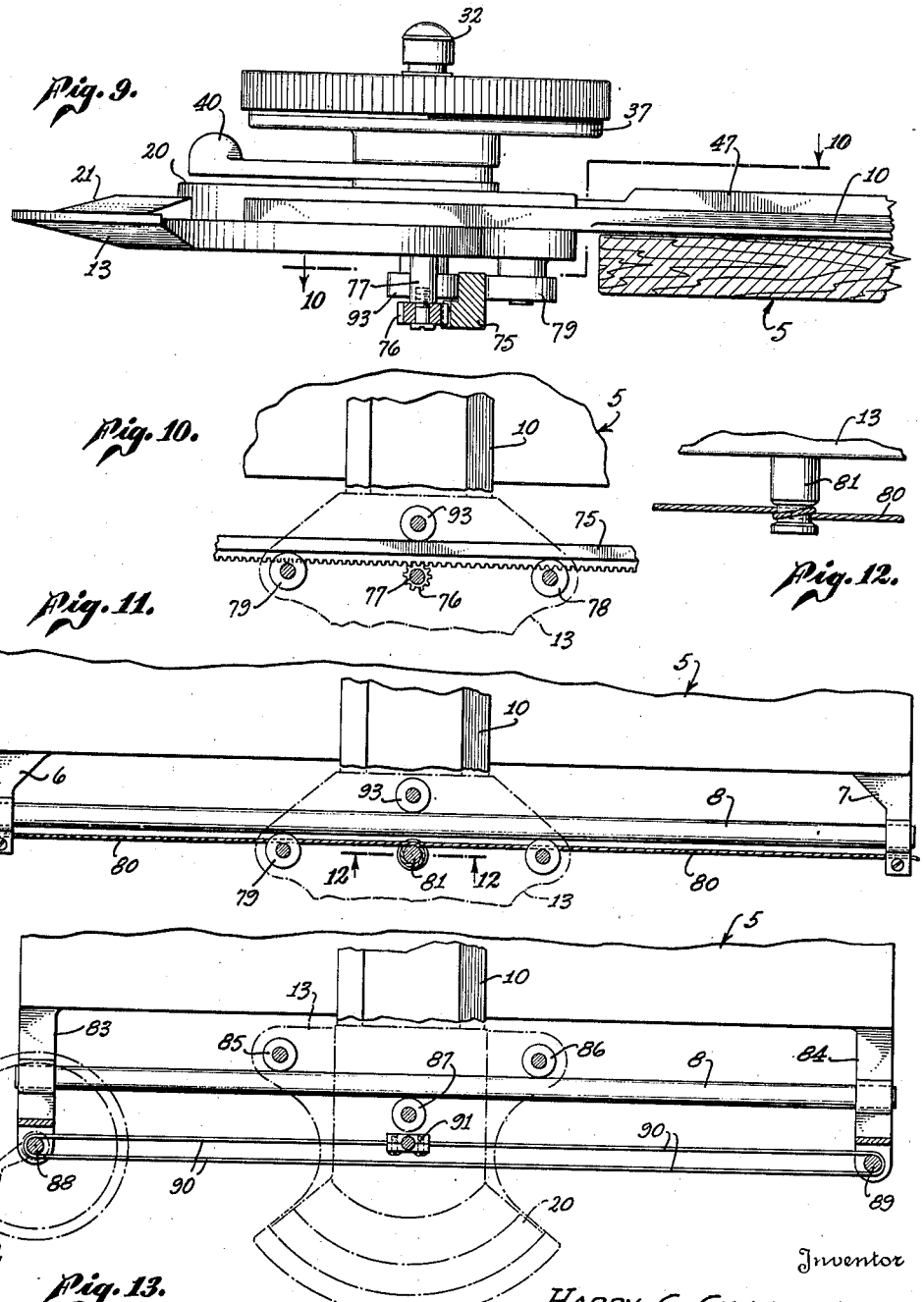

Patented June 3, 1941

2,243,838

UNITED STATES PATENT OFFICE 2,243,838

DRAFTING MACHINE

Harry G. Cunningham, Los Angeles, Calif.

Application August 7, 1939, Serial No. 288,759

15 Claims. (Cl. 33—76)

This invention relates to drafting or drawing apparatus and particularly to a drafting machine for use on drawing boards, tables, stands, easels and layout machines.

Drafting machines employing pantographic arrangements are well known, such machines maintaining parallelism of a scale or straight-edge or scales and straight-edges arranged normal to one another. It is also well known that these drafting machines make drawing faster and easier by eliminating certain manipulations. The present invention is an improved drafting machine which further increases the speed and ease of making drawings or layouts as well as improving the quality of the drawings. This is accomplished by eliminating the necessity of reaching for, handling, manipulating and aligning rules, T-squares, triangles, scales, straight-edges, protractors and certain other drawing accessories. It substantially eliminates the use of these accessories as well as minimizes the use of parallels, proportional dividers and squares. It makes the enlarging and reducing of drawings to any scale as simple and easy as the making of normal-scale drawings.

The present invention may be quickly and easily attached to any drawing or layout board or table, and, when attached, does not interfere with the movements of a draftsman. It utilizes two I-squares, straight-edges or scales adjustable with respect to one another. In addition, the rotatable point for each straight-edge is provided with a protractor for measuring its angular adjustment.

The principal feature of the invention is the provision of interchangeable indicia dials and a movable pointer individual to each straight-edge, the respective pointer being rotatable over its indicia in accordance with the amount of movement of its straight-edge, this amount of movement being accurately measured on the indicia. That is, if it is desired to draw a line parallel to another line a definite distance from the first line, it is only necessary to move the straight-edge the desired distance as measured by the pointer on the indicia. This eliminates the handling of scales and dividers in any manner. This permits the particularly rapid and accurate drawing of a plurality of parallel lines, such as crosshatching. Thus, the draftsman's work is improved while saving a great deal of time, there being no chance for accumulation errors such as occur when line distances are measured serially. By the use of the second scale or straight-edge similarly mounted with its indicia and pointer, lines perpendicular to the first straight-edge may be measured and drawn in a similar manner. Also, by the use of the protractors, diagonal distances may be directly and rapidly measured.

The apparatus also provides protractor means so that each straight-edge or scale may be positioned at any angle with respect to the paper or each other. By the use of indicia pertinent to architectural design or different types of engineering design, the change from one type of drawing to another may be quickly made. Also for enlarging or reducing drawings, it is only necessary to use a scale having the appropriate indicia thereon. Shrinkage scales for molding layout work may also be employed.

The principal object of the invention, therefore, is to facilitate the making of drawings or layouts.

Another object of the invention is to reduce the time required for making drawings and layouts and to improve the quality of such work.

A further object of the invention is to provide a drawing or layout machine having a scale, T-square or straight-edge, the distance of movement of which is automatically measured.

A further object of the invention is to provide a plurality of interconnected scales or straight-edges, the movements thereof with respect to a drawing or each other being automatically measured.

A further object of the invention is to adapt a drafting machine to any drawing scale.

Although the novel features which are believed to be characteristic of this invention are pointed out with particularity in the claims appended herewith, the manner of its organization and the mode of its operation will be better understood by referring to the following description read in conjunction with the accompanying drawings forming a part thereof, in which Fig. 1 is a plan view of a drawing board with the drawing machine of the invention attached thereto;

Fig. 6 is a plan view of the attachment for the second straight-edge;

Fig. 7 is a cross-sectional view taken along the line 7—7 of Fig. 6;

Fig. 8 is a detailed view taken along the line 8—8 of Fig. 6;

Fig. 9 is an elevational view of another embodiment of the invention showing a rack and pinion connection;

Fig. 10 is a detailed view taken along the line 10—10 of Fig. 9;

Fig. 11 is a plan view of another driving arrangement for the dial pointer;

Fig. 12 is a detailed view taken along the line 12—12 of Fig. 11; and

Fig. 13 is a plan view showing a remote dial control.

Figure 1:
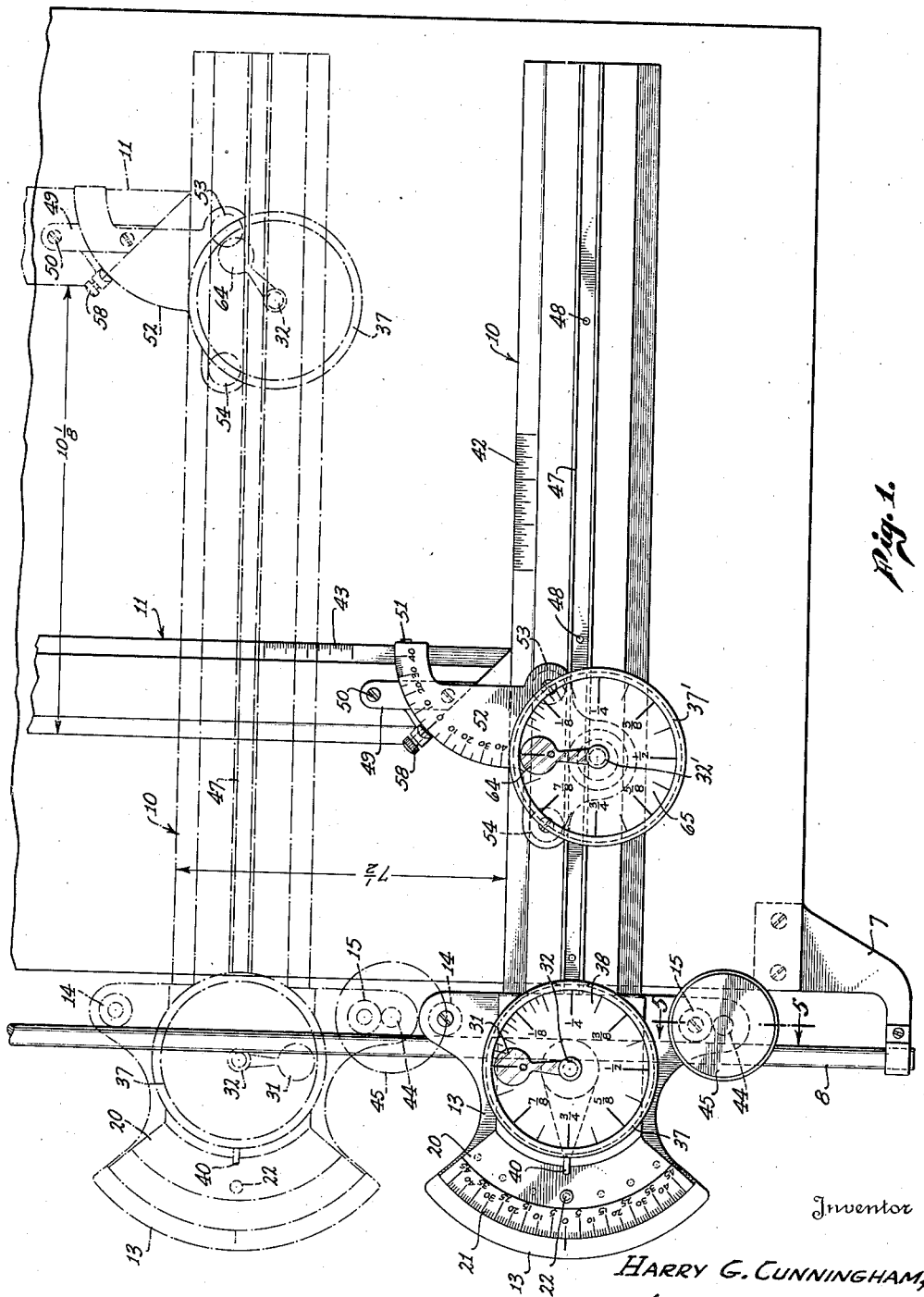
Figure 2:
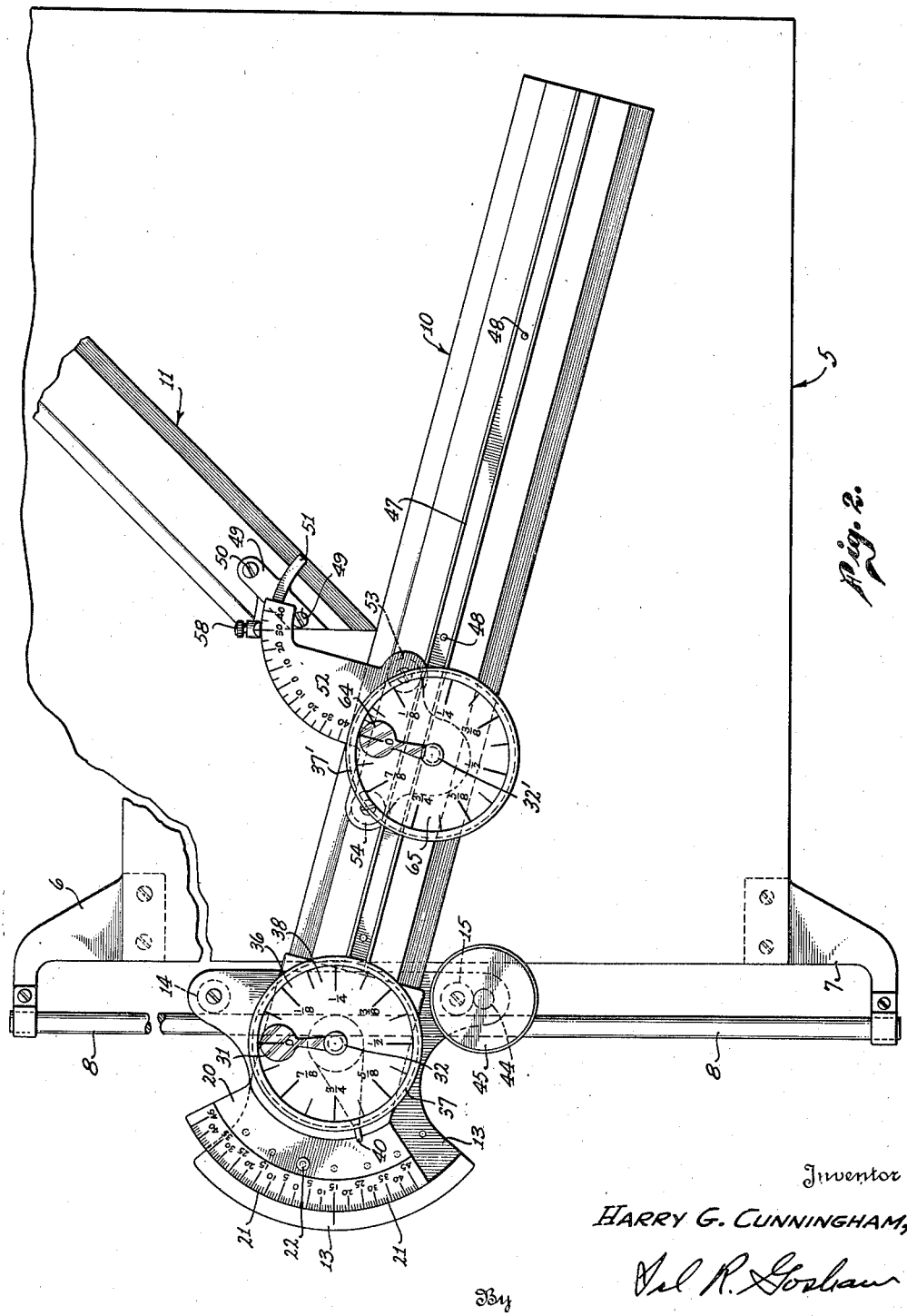
Fig. 2 is a plan view of the drafting machine of the invention showing one adjustment thereof.

Referring now to the drawings, in which like numerals identify the same elements, a drafting board 5, which may be a table, stand or easel top, has mounted at the upper left-hand and lower left-hand corners thereof brackets 6 and 7. Mounted between the ends of these brackets is a cylindrical rod 8 which provides the track and supporting mechanism for one end of a straight-edge or T-square 10 upon which is mounted a second straight-edge or T-square 11. The mounting for the straight-edge 10, as shown in cross-section in Fig. 3, comprises a fan-shaped plate 13, upon which are mounted rollers 14 and 15 on one side of the rod 8, and a shaft roller 17 on the other side of the rod. Supported immediately on top of plate 13 and in slidable contact therewith is a second rotatable fan-shaped indicia plate 20 adapted to rotate about the axis of roller shaft 17 and between which and plate 13 is fastened the end of straight-edge or T-square 10. The chamfered portion of plate 20 carries indicia as shown in Figs. 1 and 2 at 21, the plate being held in its normal position with respect to plate 13 by the manually spring-pressed pin 22 in plate 20 which is insertable in detents in plate 13, these detents being positioned at commonly used angles, such as zero, 15°, 30° and 45°.

Figure 3:
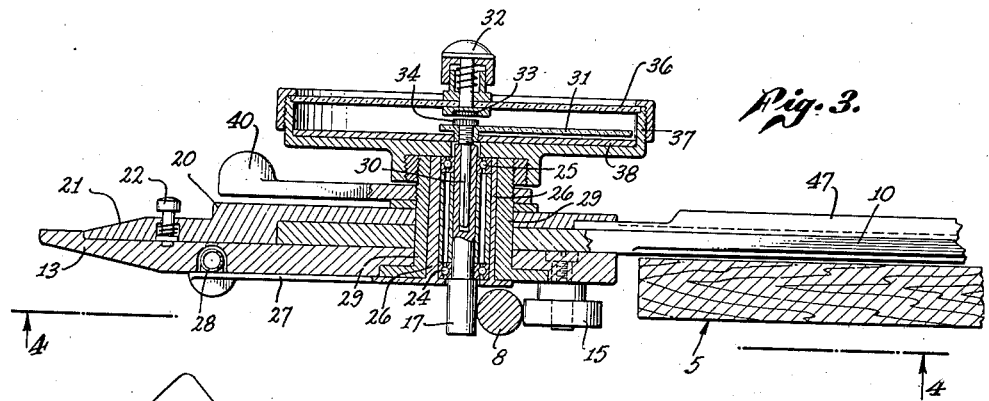
Fig. 3 is a cross-sectional view of the straight-edge attachment to the machine.
Figure 4:
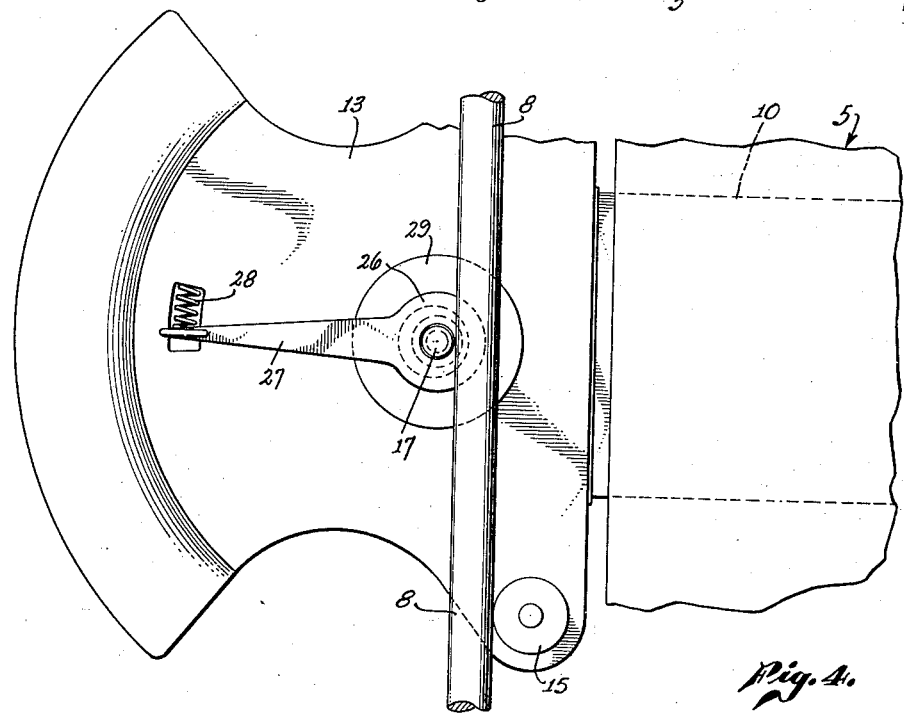
Fig. 4 is a bottom view of the machine taken along the line 4—4 of Fig. 3.

Referring now specifically to Figs. 3 and 4, the shaft roller 17 is mounted upon ball bearings 24 and 25 within an eccentric cylindrical member 26 having a lever 27 extending under plate 13. The lever 27 is urged under compression of a spring 28 to rotate the eccentric, which causes the roller 17 to bear firmly against rod 8. The roller may be released from the rod by reverse pressure on the lever 27. Surrounding eccentric 26 is a cylindrical sleeve 29 which is threaded at its upper end. Threadedly mounted on this threaded portion of sleeve 29 is finger lever 40, rotation of which presses plates 13 and 20 together. Thus lever 40 can lock plate 20 in any adjusted angular position, such as the intermediate positions between the commonly used angle positions located by pin 22.

The shaft 17, rotatable in its bearings 24 and 25, drives, by means of a split pin 30 frictionally held in an aperture in the shaft 17, a pointer 31, the end of which may carry a magnifying lens. Mounted coaxially with the pin 30 is a spring-mounted finger knob 32 which, when pressed downwardly, makes contact between its enlarged end 33 and the upper enlarged end 34 of pin 30. The friction of pin 30 in shaft 17 is such that the pointer 31 may now be rotated in either direction by the knob 32 without movement of the shaft 17. The finger knob 32 is mounted upon an upper circular, transparent plate 36 of a cup-shaped member 37 which has mounted therein an indicia plate or dial 38.

From the above description it will be observed that the pointer 31 may be positioned at any particular number on the indicia of plate 38 for any certain position of the straight-edge. That is, the pointer may be quickly set to zero position for any position of the straight-edge on the board. Now as the straight-edge is moved upwardly to a position as shown by the dotted lines in Fig. 1, the pointer 31 will be rotated over the dial indicia to measure the distance of travel. Thus, as shown in Fig. 1, the transmission ratio is one revolution per inch so that a movement of 7½ inches would rotate the pointer 7½ times, the dial resting at the position shown by the dotted lines. So, from a predetermined base line any parallel lines desired at different distances from the base line may be easily and quickly made by simply moving the T-square the proper distance as shown by the pointer and dial. It is, therefore, unnecessary to use a scale to mark off the points for the lines. Scales, however, may be placed on the straight-edges 10 and 11 as partially shown at 42 and 43. Preferably, the straight-edges are made of a transparent material such as Celluloid or lucite without the scales so that the drawing lines will be visible therethrough.

Figure 5:
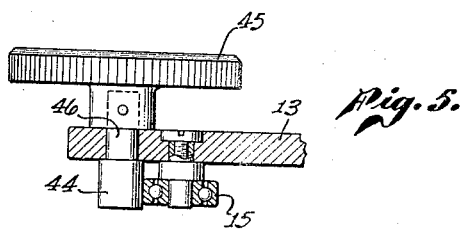
Fig. 5 is a detailed view of the vernier arrangement of the machine taken along the line 5—5 of Fig. 1.

Ordinarily, movement of the straight-edge is accomplished by simply pushing or pulling the straight-edge over the board. However, if small distances of travel are desired, a vernier attachment has been provided as shown in detail in Fig. 5 and in plan in Fig. 1. This vernier attachment comprises a knurled finger knob 45 fixedly pinned to a shaft 46 having at its end a roller 44 which contacts the rod 8. Thus, rotation of the knob 45 will adjust the T-square 10 in small increments across the board 5.

Referring now to the attachment of the second straight-edge 11 to straight-edge 10, reference is made to Figs. 1, 2, 6, 7 and 8. Mounted longitudinally of straight-edge 10 is a U-shaped channel track 47 attached to the straight-edge 10 by screws 48 as shown in Fig. 7. Although the track 47 is shown U-shaped, and track 8, cylindrical, it is to be understood that other track shapes may be employed. The T-square 11 is mounted on a bracket 49 by screws 50, the bracket 49 having a circular segmentary projection 51 which is accommodated by a similarly shaped slot in a bracket 52 which is mounted on the track 47. The bracket 52 carries a pair of rollers 53 and 54 on one side of the track 47, and a roller shaft 55 similar to shaft 17 on the other side of the track. The roller shaft 55 is mounted upon ball bearings 56 and has mounted thereon a circular housing 37' similar to housing 37 in Fig. 3 which contains identical elements such as the adjustable pointer mechanism 32' as shown at 32 in Fig. 3.

To position the T-square 11 at any angle with respect to T-square 10, it is only necessary to release the set screw 58 carried by bracket 49 and which bears against the outer rim portion of the notch in bracket 52, swing the straight-edge 11 to any desired position as indicated on the indicia carried by the bracket 52, and then tighten the screw 58. (See Figs. 1 and 2.) To maintain the roller shaft 55 under pressure contact with the track 47 to prevent slippage along the track, the shaft 55 is under tension of a compression spring 60 which bears against a pin 61 in an eccentric bushing 62 as shown in Figs. 6 and 7. Thus, the shaft 55 is being continually forced against the track 47 to maintain the accuracy of the pointer 64 with respect to the indicia plate 65 similarly to the eccentric 26 and lever 27 of Figs. 3 and 4.

Thus, not only is a mechanism provided for measuring the movement of the straight-edge 10 in one direction along the board 5, but also a mechanism is provided for measuring movements of the straight-edge 11 normal to the straight-edge 10. The mechanism also provides a protracting arrangement which permits various angulations of straight-edge 11 with respect to straight-edge 10 to be obtained quickly and easily without the use of a separate protractor, as shown in an adjusted position of straight-edge 11 in Fig. 2. By the dotted lines in Fig. 1, however, the straight-edge 11 is shown positioned 10⅛ inches from a former position, the distance being measured by pointer 64 and dial 65. Should a draftsman wish to determine the length of a diagonal, he need only rotate straight-edge 10 to a position parallel with the diagonal, and measure it with straight-edge 11.

The dials 38 and 65 are removable and thus may be replaced with dials carrying different indicia, such as decimal numbers, reduction, enlargement or shrinkage scales. For instance, the dial shown in Figs. 1 and 2 provides that the pointer 31 makes one revolution for one inch of movement of the straight-edge 10. Should it be desired to make a reduction drawing, say of one-half, it is only necessary to substitute, for the dial 31, a dial in which two inches are shown for each revolution of the pointer 31. Also for various types of work wherein a different scale of dimensions are desired in one direction and another scale in the other direction, it is only necessary to provide the required dials at the respective measuring points. Since accumulation errors are eliminated, the device has permitted a decided reduction in the drawing time required for such work as crosshatching, while producing a uniformity of lines very difficult to obtain with the apparatus now known in the art.

Although the above-described modification shows a cylindrical rod and a frictional contact pointer driving element, in Figs. 9 and 10 a different type of drive employing a rack and pinion is provided. As shown in these figures, a rack 75 has a lower rack portion and an upper smooth track portion, the teeth of the rack meshing with a pinion gear 76 connected to the pointer shaft 77. A three-point suspension is provided for the straight-edge by a roller 93 on one side of the track portion and rollers 78 and 79 on the other side. The other elements of the mechanism are identical with the embodiment just described. This modification, however, provides an absolute or positive drive between the mounting rod and the movable portion of the machine.

In Figs. 11 and 12, another form of drive is illustrated wherein a flexible cable 80 is attached to the end brackets 6 and 7 along with the rod 8, the cable being wrapped around a narrowed portion of the pointer drive shaft 81. The mounting plate 13 again has a three-point suspension on the rod 8 with rollers 93, 78 and 79 as in Figs. 9 and 10.

Referring now to the Fig. 13, this modification is one wherein the measurement indications of the movements of the T-square 10 are made at a remote point, for instance, at the upper bracket 83 of the board 5, a similar bracket 84 being at the other end of the board. The cylindrical rod 8 is supported by the brackets while the supporting member 13 has a three-point mounting on the rod by rollers 85, 86 and 87. On each end of the brackets 83 and 84 pulleys 88 and 89 are provided around which is an endless belt 90 which may be a steel tape. The support 13 is attached to the tape at 91 so that movements of the straight-edge 10 will move the belt 90.

To indicate measurements of the straight-edge 10, the pulley 88 drives the pointer 92, which may be of the same type as above-described in connection with the other modifications. This modification reduces somewhat the mechanism mounted directly on the T-square, it being understood, of course, that the dial mechanism may also be located at a point more remote than that shown in Fig. 13.

From the above description and accompanying drawings it will be observed that a drafting machine has been provided which will avoid the necessity of using aligning rules, T-squares, triangles, scales, straight-edges, protractors and other drawing accessories which must be used in making drawings. It is also an improvement over the present drafting machines which simply provide parallel scales or T-squares at different positions over the drawing board. Thus, with the present machine not only is the making of different types of drawings speeded up, but a decided improvement in the drafting work is obtainable.

Use of the machine for layout work is particularly advantageous since shrinkage or compensating indicia dials may be employed on the machine, especially for mold layouts where shrinkage occurs in the molding process. This is also true in the layout of templates where the material is cut to definite lines.

I claim:

1. A measuring device for the straight-edge of a drawing board comprising a rotatable member adapted to be rotated with movement of said straight-edge, a pointer frictionally connected with said rotatable member, an indicia dial associated with said pointer, a housing for enclosing said dial and pointer, means mounted on said housing coaxially with said rotatable member for contacting said pointer for the adjustment thereof, and means for preventing rotation of said rotatable member with movement of said straight-edge.

2. In a drafting machine, the combination of a drafting board, a stationary track supported by said board, a straightedge, a straightedge head mounted on said track, said head having an upper and lower portion adjustable with respect to one another, means for mounting the lower portion of said head to said track, means for mounting said straightedge to said upper portion, means passing through said portions for adjusting said upper portion over said lower portion, means for locking said portions at any adjusted position, means for automatically locking said portions in one predetermined position, measuring means comprising a stationary dial having indicia thereon and a movable pointer, means for rotating said pointer, said means being a part of said means for mounting the lower portion of said head to said track, and means for adjusting said pointer independently of said last-mentioned means.

3. In a drafting machine, the combination of a board, a fixed rod attached to one end of said board, a straightedge head, a plurality of rollers adapted to be distributed along said rod for mounting said head to said rod, a cylindrical collar through said head, means for rotating said straightedge about said collar, means surrounding said collar for clamping said straightedge to said head, means rotatable with the movement of said straightedge, and an eccentric bushing for mounting said last-mentioned means, said bushing being manually rotatable for removing said shaft from said rod.

4. A drafting machine comprising the combination of a board, a rod mounted at one end of said board, a straightedge, a movable head to which said straightedge is attachable, said head having a lower portion fixed with respect to said board and an upper portion adjustable with respect to said board, a cylindrical collar through said head, a shaft through said collar, an eccentric mounting for said shaft within said collar, means for rotating said eccentric for adjusting said shaft to and from said rod, and a housing mounted on the upper end of said collar, said housing containing a stationary dial and a movable pointer connected to said shaft, a track on said straightedge, and a second straightedge head mounted on said track.

5. A drawing machine comprising a board, a rod having a curved surface fixedly attached to one end of said board, a straightedge, a mounting bracket for mounting said straightedge to said rod, said bracket comprising a lower portion and an upper portion, said upper portion being attached to said straightedge and said lower portion being mounted on said rod, a collar passing through said portions, and an eccentric within said collar, a second collar within said first collar, and a shaft within said second collar adapted to be rotated therein, one end of said shaft contacting the curved surface of said rod, a housing mounted on the upper end of said collar, a pointer within said housing connected to said rotatable shaft, and a second shaft mounted on said housing and normally out of contact with said pointer for manually adjusting said pointer.

6. A drafting machine comprising a board, a straightedge, a track mounted along one edge of said board, a head to which said straightedge is attached, a plurality of rollers mounted under said head and contacting said track on opposite sides thereof, a rotatable shaft passing through said head, one end thereof adapted to contact said track, means for removing said shaft from said track, a housing mounted above said head, means within said housing for indicating the movements of said straightedge along said board, and means for adjusting said last-mentioned means independently of the movements of said straightedge.

7. A drafting machine comprising a stationary dial, a housing for said dial, a rotatable pointer adapted to move over said dial and positioned within said housing, a manually operable member adapted to contact said pointer and move said pointer relative to said dial, a rotatable shaft for moving said pointer relative to said dial, a stationary shaft, and means adpted to move said rotatable shaft into and out of contact with said stationary shaft, said means exerting a predetermined pressure between shafts when in contact.

8. A drafting machine in accordance with claim 7 in which said last-mentioned means includes an eccentric mounting for said movable shaft with manual control means therefor.

9. A drafting machine comprising a dial, a member rotatable relative to said dial, means for rotating said rotatable member over said dial to indicate the amount of movement of said rotatable member and said dial, and means for rotating said rotatable member with respect to said dial when said dial is stationary, said first-mentioned means including a rotatable shaft connected to said rotatable member, a stationary track, and a mounting for said rotatable shaft for adjusting said shaft into and out of contact with said stationary track, and said last-mentioned means including a manually rotatable element adapted to contact said rotatable member.

10. A drafting machine comprising a lower body portion and an upper body portion, a straight-edge attached to said upper body portion, a stationary shaft, a plurality of rollers on said lower body portion for movably mounting said body portions on said shaft, means driven by one of said rollers for indicating the movement of said body portions along said shaft, a cylindrical collar extending through said body portions and fixedly attached to said lower body portion, manual means for clamping said upper body portion to said collar in any adjusted position of said upper body portion with respect to said lower body portion, and an eccentric mounting for said driving roller for adjusting said roller with respect to said stationary shaft.

11. A drafting machine comprising a straightedge head, a straightedge attached to said head, a track on said straightedge, a second straightedge, and means for mounting said second straightedge for movement along said track, said means comprising a plurality of rollers distributed along said track, an eccentric mounting for one of said rollers for adjusting said rollers in contact with said track, resilient means for producing a tension on said eccentric, and means driven by said eccentrically mounted roller for indicating the amount of movement of said second straightedge along said track.

12. A drafting machine comprising a stationary member secured to a drafting board, a rotatable shaft adapted to contact said member and be rotated thereby when said shaft is moved along said member, a spring-actuated eccentric bushing for mounting said shaft, a straightedge head having lower and upper portions adjustable with respect to one another, said bushing being mounted in said head, means for clamping one of said head portions in any adjusted position with respect to said other head portion, indicia for indicating said position, a rotatable pointer rotatable with said rotatable shaft, indicia associated with said pointer for indicating the position of said straightedge on said board, and means for adjusting said pointer independently of said rotatable shaft.

13. A drafting machine comprising a stationary shaft mounted on a drafting board, a straightedge head having upper and lower portions, said straightedge being mounted on one of said portions, a collar extending through said head and fixedly attached to one of said portions, said other portion being rotatable about said collar for positioning said straightedge on said board, a plurality of rollers for mounting said head on said stationary shaft for movement of said head and straightedge over said board, an indicia dial, a pointer adapted to be rotated over said dial, means for adjusting said pointer when said straightedge is stationary, and means for rotating said pointer with movement of said straightedge.

14. A drafting machine in accordance with claim 13 in which said last-mentioned means includes one of said mounting rollers and a spring-actuated eccentric bushing for mounting said roller.

15. A drafting machine in accordance with claim 13 in which a housing is provided for said dial and pointer, said pointer adjusting means being mounted on said housing in axial alignment with said means for rotating said pointer.

HARRY G. CUNNINGHAM.